United States Patent
Mao et al.

(10) Patent No.: US 11,555,380 B2
(45) Date of Patent: Jan. 17, 2023

(54) DOWNHOLE POWER GENERATION SYSTEM AND METHOD

(71) Applicant: General Electric Company, Schenectady, NY (US)

(72) Inventors: Saijun Mao, Shanghai (CN); Yunzheng Chen, Garching (DE); Yi Liao, Niskayuna, NY (US); Xuele Qi, Niskayuna, NY (US); Ming Xue, Shanghai (CN); Stewart Blake Brazil, Niskayuna, NY (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 402 days.

(21) Appl. No.: 16/608,030

(22) PCT Filed: Apr. 24, 2018

(86) PCT No.: PCT/US2018/029055
§ 371 (c)(1),
(2) Date: Oct. 24, 2019

(87) PCT Pub. No.: WO2018/200461
PCT Pub. Date: Nov. 1, 2018

(65) Prior Publication Data
US 2020/0056458 A1 Feb. 20, 2020

(30) Foreign Application Priority Data
Apr. 24, 2017 (CN) .......................... 201710270838.6

(51) Int. Cl.
*E21B 41/00* (2006.01)
*F03B 13/02* (2006.01)
(Continued)

(52) U.S. Cl.
CPC .......... *E21B 41/0085* (2013.01); *F03B 13/02* (2013.01); *F03B 13/10* (2013.01);
(Continued)

(58) Field of Classification Search
CPC ...... E21B 41/0085; F03B 13/02; F03B 13/10; H02K 7/1823; H02K 11/0094;
(Continued)

(56) References Cited

U.S. PATENT DOCUMENTS

2004/0062058 A1 4/2004 Hann et al.
2007/0194948 A1 8/2007 Hall et al.
(Continued)

OTHER PUBLICATIONS

International Search Report of the International Searching Authority for PCT/US2018/029055 dated Aug. 14, 2018.

*Primary Examiner* — Charles Reid, Jr.
(74) *Attorney, Agent, or Firm* — Cantor Colburn LLP

(57) ABSTRACT

A downhole power generation includes a power generation module for providing power to a load. A turbine is driven by flow of a downhole fluid to rotate. A generator is coupled with the turbine for converting rotational energy from the turbine to electrical energy, and an AC-DC rectifier is coupled with the generator for converting an alternating voltage from the generator to a direct voltage. A power conversion circuit couples the AC-DC rectifier with the load. The power conversion circuit is configured for providing a first power to the load when the load is in a working mode and providing a second power to the load when the load is in a non-working mode. The second power is less than the first power. A downhole power generation method is also disclosed.

18 Claims, 4 Drawing Sheets

(51) Int. Cl.
- *F03B 13/10* (2006.01)
- *H02K 7/18* (2006.01)
- *H02K 11/00* (2016.01)
- *H02K 11/04* (2016.01)

(52) U.S. Cl.
CPC ....... *H02K 7/1823* (2013.01); *H02K 11/0094* (2013.01); *H02K 11/046* (2013.01)

(58) Field of Classification Search
CPC ......... H02K 11/046; Y02E 10/20; H02P 9/48; H02J 1/00; H02J 1/082
USPC .......................... 166/244.1; 290/1 R, 43, 54
See application file for complete search history.

(56) References Cited

U.S. PATENT DOCUMENTS

| | | |
|---|---|---|
| 2014/0354081 A1 | 12/2014 | Li et al. |
| 2015/0303771 A1* | 10/2015 | Downing ............ E21B 41/0085 290/52 |
| 2015/0303819 A1 | 10/2015 | Qu et al. |
| 2016/0333670 A1 | 11/2016 | Tegeler et al. |
| 2017/0362953 A1* | 12/2017 | Gatzen ................ E21B 41/0085 |

* cited by examiner

DOWNHOLE POWER GENERATION SYSTEM AND METHOD

BACKGROUND

This disclosure relates generally to power generation systems, and more particularly to a downhole power generation system and a downhole power generation method.

Downhole drilling or sensing systems are used in oil and gas exploration and production wells. Some downhole sensors for fracturing monitoring and long-term production surveillance, downhole data communication module and other downhole loads are often applied to the downhole drilling or sensing systems for performing their respective functions. These downhole loads require power to operate. It is well known in the art to use a turbine to convert mechanical power from a downhole fluid, for example production fluid, into rotational energy to drive an electrical generator. Then, the electrical generator can generate electrical energy and power can be thus provided to these downhole loads.

During working of the downhole loads, the downhole loads may require a high power. While when the downhole loads are in a non-working condition, for example in a standby state, the downhole loads may only require a low power. In order to ensure operation of the downhole load, usually, a conventional downhole power generation device always designed according to the high power rating and therefore may have poorer efficiency when the downhole power generation device delivers a low power in the non-working condition. It would no doubt increase power loss.

Therefore, it would be desirable to provide improvements on power generation to solve at least one of problems above-mentioned.

BRIEF DESCRIPTION

In one aspect of embodiments of the present disclosure, a downhole power generation system is provided. The downhole power generation system comprises a power generation module for providing power to a load, comprising a turbine driven by flow of a downhole fluid to rotate, a generator coupled with the turbine for converting rotational energy from the turbine to electrical energy, and an AC-DC rectifier coupled with the generator for converting an alternating current voltage from the generator to a direct current voltage, and a power conversion circuit coupling the AC-DC rectifier with the load. The power conversion circuit is configured for providing a first power to the load when the load is in a working mode and providing a second power to the load when the load is in a non-working mode. The second power is less than the first power.

In another aspect of embodiments of the present disclosure, a downhole power generation method is provided. The downhole power generation method comprises: driving one or more turbines, by flow of a downhole fluid, to rotate; converting one or more rotational energies from the one or more turbines, by one or more generators, to one or more electrical energies respectively; converting one or more alternating current voltages from the one or more generators, by one or more AC-DC rectifiers, to one or more direct current voltages respectively; converting the one or more direct current voltages, by controlling a first DC-DC converter, to a first power and providing the first power to a load when the load is in a working mode; and converting the one or more direct current voltages, by controlling a second DC-DC converter, to a second power and providing the second power to the load when the load is in a non-working mode. The second power is less than the first power.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure will be described hereinbelow with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. In addition, Terms indicating specific locations, such as "top", "bottom", "left", and "right", are descriptions with reference to specific accompanying drawings. Embodiments disclosed in the present disclosure may be placed in a manner different from that shown in the figures. Therefore, the location terms used herein should not be limited to locations described in specific embodiments.

First Embodiment of Downhole Power Generation System

Figure 1:
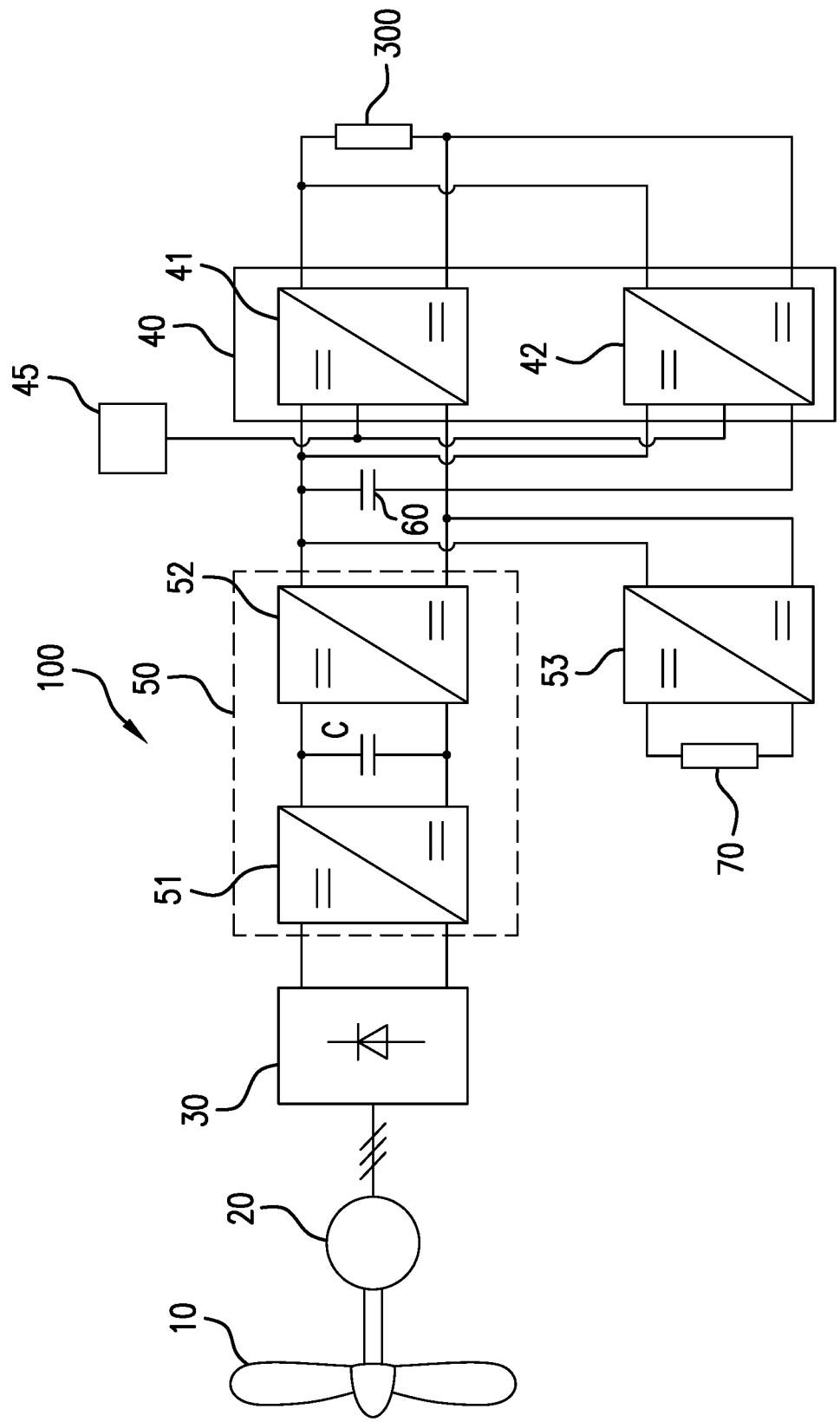
FIG. 1 is a schematic diagram of a downhole power generation system in accordance with an embodiment of the present disclosure.

FIG. 1 illustrates a schematic diagram of a downhole power generation system 100 in accordance with an embodiment of the present disclosure. As shown in FIG. 1, the downhole power generation system 100 includes a power generation module for providing power to a load 300 and a power conversion circuit 40. The power generation module includes a turbine 10, a generator 20 coupled with the turbine 10, and an AC-DC (Alternating Current-Direct Current) rectifier 30 coupled with the generator 20. The power conversion circuit 40 couples the AC-DC rectifier 30 with the load 300. The load 300 may for example include sensors such as temperature and pressure sensor, flow rate sensor, or a data communication module. The turbine 10 can be driven by flow of a downhole fluid to rotate. The generator 20 can convert rotational energy from the turbine 10 to electrical energy. The AC-DC rectifier 30 can convert an alternating current (AC) voltage from the generator 20 to a direct current (DC) voltage. When the load 300 is in a working mode, the power conversion circuit 40 can provide a first power to the load 300. When the load 300 is in a non-working mode, the power conversion circuit 40 may provide a second power to the load 300. The second power is less than the first power. As an implement, the first power is a high power, while the second power is a low power. For example, the high power may be in a range of few watts to several hundred watts, and the low power may be in a range of few milli-watts to several hundred milli-watts.

The downhole power generation system 100 of the present disclosure can provide a corresponding power to the load 300 based on the mode of the load 300 by means of the power conversion circuit 40. Thus, the power loss of the downhole power generation system 100 can be reduced greatly.

In one implement, the power conversion circuit 40 may include a first DC-DC (Direct Current-Direct Current) converter 41 and a second DC-DC converter 42 which are separate. The first DC-DC converter 41 couples the AC-DC rectifier 30 with the load 300 and can provide the first power to the load 300 when the load 300 is in the working mode. The second DC-DC converter 42 couples the AC-DC rectifier 30 with the load 300 and can provide the second power to the load 300 when the load 300 is in the non-working mode.

Therefore, the downhole power generation system 100 of the present disclosure can reduce power loss by using the separate first and second DC-DC converters 41, 42 for the working mode and non-working mode.

The downhole power generation system 100 may further include a power converter controller 45. The power converter controller 45 can be communicatively coupled with the first DC-DC converter 41 and the second DC-DC converter 42 respectively and can control the first DC-DC converter 41 and the second DC-DC converter 42 respectively to switch between the working mode and the non-working mode.

With continued reference to FIG. 1, in the downhole power generation system 100 of the present disclosure, the power generation module may further include a boost circuit 50. The boost circuit 50 can respectively couple the AC-DC rectifier 30 with the first DC-DC converter 41 and couple the AC-DC rectifier 30 with the second DC-DC converter 42. As an example, the boost circuit 50 may include a first step-up converter 51, a second step-up converter 52, and a capacitor C coupled between the first step-up converter 51 and the second step-up converter 52 for power buffer. The first step-up converter 51 can increase the DC voltage from the AC-DC rectifier 30. The second step-up converter 52 can further increase an increased DC voltage from the first step-up converter 51.

The downhole power generation system 100 of the present disclosure may further include a power storage device 60. The power storage device 60 is respectively between the boost circuit 50 and the first DC-DC converter 41 and between the boost circuit 50 and the second DC-DC converter 42. For example, the power storage device 60 may include a high temperature (HT) super capacitor.

The power storage device 60 may provide additional power to the load 300 when power generating from the turbine 10 is not enough for the load 300. The downhole power generation system 100 of the present disclosure may provide high power density by the power storage device 60.

The downhole power generation system 100 of the present disclosure may further include an energy storage device 70 coupled between the boost circuit 50 and the first DC-DC converter 41 via a third step-up converter 53. For example, the energy storage device 70 may include one or more high temperature (HT) primary or rechargeable batteries.

The energy storage device 70 may provide additional electrical energy to the load 300 when energy generating from the turbine 10 is not enough for the load 300. The downhole power generation system 100 of the present disclosure may provide long time operation by the energy storage device 70.

In the condition that the energy storage device 70 uses one or more HT rechargeable batteries, when the energy generating from the turbine 10 is excessive for the load 300, excessive energy generating from the turbine 10 may be stored in the energy storage devices 70.

Second Embodiment of Downhole Power Generation System

Figure 2:
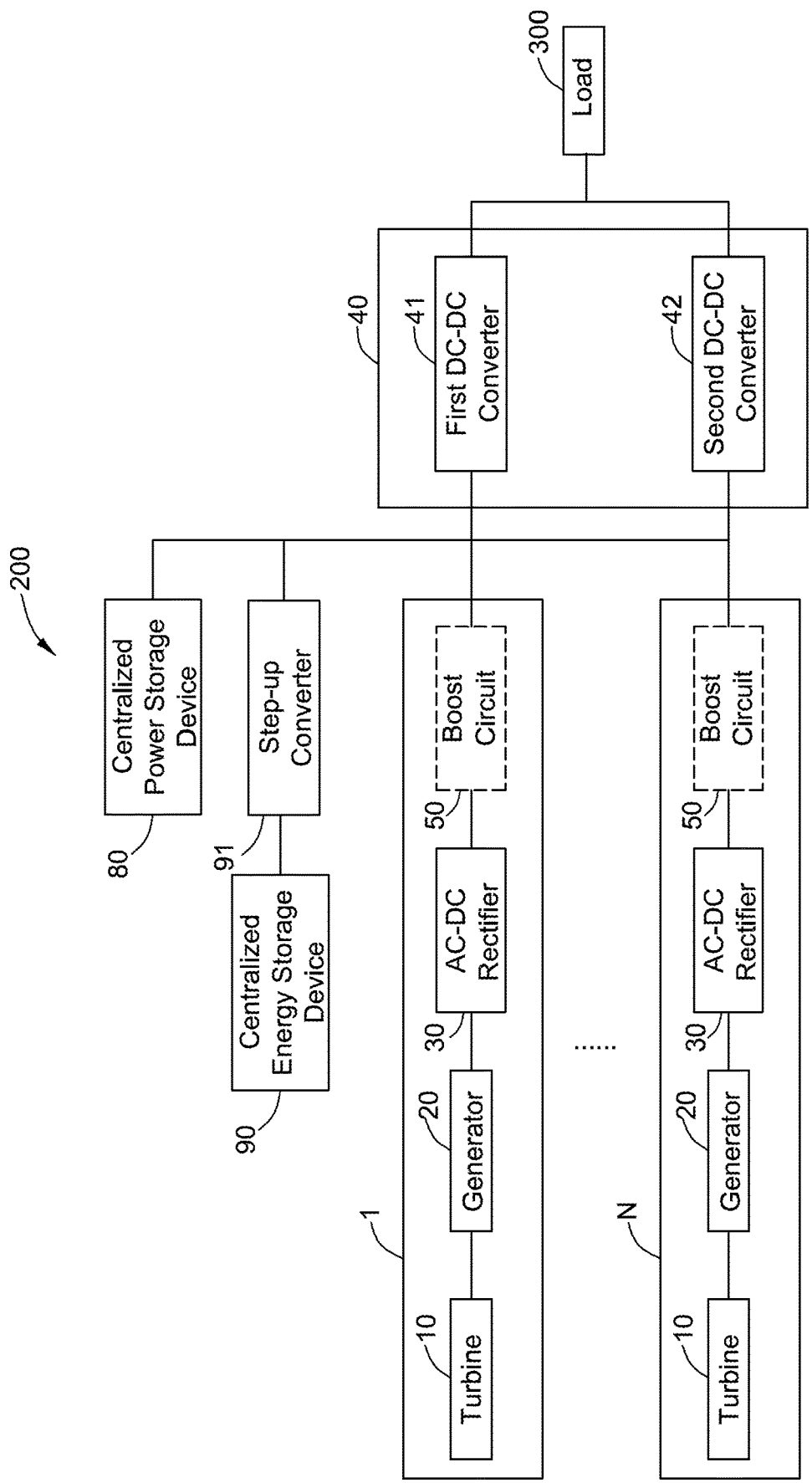
FIG. 2 is a schematic diagram of a downhole power generation system in accordance with another embodiment of the present disclosure.

FIG. 2 illustrates a schematic diagram of a downhole power generation system 200 in accordance with another embodiment of the present disclosure. As shown in FIG. 2, different from the downhole power generation system 100 of the first embodiment, the downhole power generation system 200 of the second embodiment may include a plurality of power generation modules 1-N. In the second embodiment, the power conversion circuit 40 couples the AC-DC rectifier 30 in each power generation module 1-N with the load 300. The plurality of turbines 10 in the plurality of power generation modules 1-N are so positioned physically that one or more turbines 10 is exposed to the downhole fluid. The flow of the downhole fluid may drive the one or more turbines 10 to rotate. The plurality of power generation modules 1-N can provide one more powers to the load 300.

In the downhole power generation system 200 of the present disclosure, because a multiplicity of turbines 10 can ensure that one or more of the plurality of turbines 10 is exposed to the flow of the downhole fluid in a multiphase environment, such the multi-turbine power generation configuration can achieve a reliable and redundant power supply for the load 300.

Furthermore, because the plurality of turbines 10 are distributed in the multiphase environment, the plurality of turbines 10 may be driven by the downhole fluid having different flow rates due to respective different physical positions and may thus have different rotational speeds. Due to different physical positions of respective turbines 10 of the plurality of power generation modules 1-N, the plurality of power generation modules 1-N may generate different amounts of power. All the different amounts of power can be provided to the load 300. The amounts of power generated from the plurality of power generation modules 1-N depend on physical positions of respective turbines 10. The downhole power generation system 200 of the present disclosure allows each of the plurality of turbines 10 to rotate at the different rotational speed.

Figure 3:
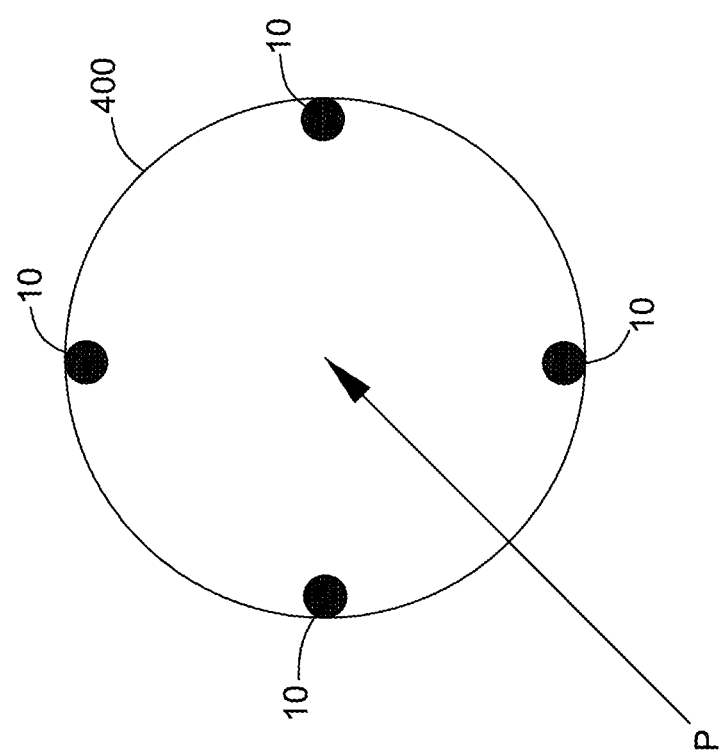
FIG. 3 is an exemplary example of distribution of turbines in a casing.

The plurality of turbines 10 in the plurality of power generation modules 1-N may be distributed around a flow path P (as shown in FIG. 3) of the downhole fluid. In one embodiment, the downhole fluid flows within a casing 400

(as shown in FIG. 3), and the plurality of turbines 10 may be spacedly arranged at an inner circumferential wall of the casing 400 or deployed closer to the center of the casing 400. The plurality of turbines 10 distributed in the multiphase environment can ensure that the flow of the downhole fluid can drive at least one turbine 10 to operate and it thus provide a redundant and more reliable power supply to the load 300.

As an example, FIG. 3 illustrates a distribution of four turbines 10 in the casing 400. With reference to FIG. 3, the four turbines 10 may be respectively arranged at a top inner wall, a bottom inner wall, a left inner wall and a right inner wall of the casing 400. When the flow rate of the downhole fluid is sufficient, the downhole fluid may be full of the whole casing 400, in this circumstance, all the four turbines 10 may operate, but the four turbines 10 may be driven by the downhole fluid having different flow rates. For example, because the downhole fluid may include many impurities, the flow of the downhole fluid at the top inner wall of the casing 400 may be dominated by gas and the flow of the downhole fluid at the bottom inner wall of the casing 400 may be blocked by sedimentation. In a word, the flow of the downhole fluid in the multiphase environment may be different. When the flow rate of the downhole fluid is less, the downhole fluid may not fill the whole casing 400, in this circumstance, only a portion of the four turbines 10 may operate and may be also driven by the downhole fluid having different flow rates.

However, the distribution of turbines 10 in the casing 400 as shown in FIG. 3 is only as an example. The number of turbines 10 of the present disclosure should be not limited to be four, and the downhole power generation system 200 of the present disclosure may include two, three or more turbines 10. In addition, the distribution of turbines 10 of the present disclosure in the casing 400 should be not limited herein. The turbines 10 of the present disclosure may be evenly or unevenly distributed at the inner circumferential wall of the casing 400 or deployed closer to the center of the casing 400. As a matter of fact, the number and the distribution of turbines 10 of the present disclosure can be suitably selected based on the downhole fluid and its flow condition and in combination of product costs.

Returning to FIG. 2, the downhole power generation system 200 of the second embodiment may further include a centralized power storage device 80. The centralized power storage device 80 is respectively between each power generation module 1-N and the first DC-DC converter 41, and between each power generation module 1-N and the second DC-DC converter 42. The centralized power storage device 80 may include for example a HT super capacitor.

With continued reference to FIG. 2, the downhole power generation system 200 of second embodiment may further include a centralized energy storage device 90. The centralized energy storage device 90 is coupled between each power generation module 1-N and the first DC-DC converter 41 via a step-up converter 91. The centralized energy storage device 90 may include for example one or more high temperature (HT) primary or rechargeable batteries.

Such the centralized power storage device 80 and/or the centralized energy storage device 90 can reduce volume of the downhole power generation system 200 in a limited space of downhole environment, and can provide a more compact and cost effective design for the downhole power generation system 200 of the present disclosure.

Downhole Power Generation Method

Figure 4:
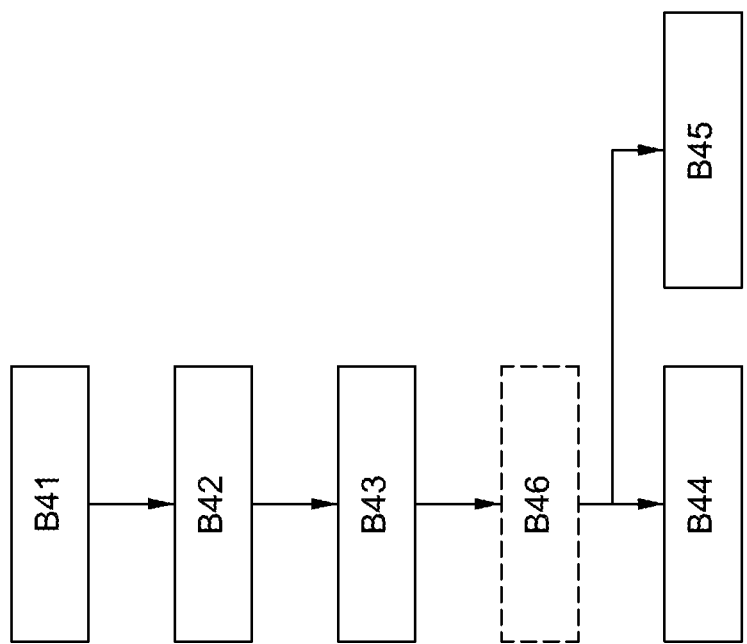
FIG. 4 is a flow chart of an exemplary downhole power generation method in accordance with an embodiment of the present disclosure.

FIG. 4 illustrates a flow chart of an exemplary downhole power generation method in accordance with an embodiment of the present disclosure. The downhole power generation method in accordance with an embodiment of the present disclosure may include the steps as follows.

As shown in FIG. 4, in block B41, one or more turbines 10 may be driven to rotate by flow of a downhole fluid, and may thus generate one or more rotational energies. Due to different physical positions of the plurality of turbines 10, the one or more turbines 10 may be driven by the downhole fluid having different flow rates, and thus the one or more rotational energies generated may be different.

In block B42, the one or more rotational energies from the one or more turbines 10 may be converted to one or more electrical energies respectively by one or more generators 20, and one or more AC voltages may thus be generated. Because the one or more rotational energies generated may be different, the one or more electrical energies converted may also be different and the one or more AC voltages may have different voltage values.

In block B43, the one or more AC voltages from the one or more generators 20 may be converted, to one or more DC voltages respectively by one or more AC-DC rectifiers 30. Because the one or more AC voltages may have different voltage values, the one or more DC voltages converted may also have different voltage values.

In block B44, when a load 300 is in a working mode, the one or more DC voltages may be converted to a first power by controlling a first DC-DC converter 41 and the first power may be provided to the load 300.

In block B45, when the load 300 is in a non-working mode, the one or more DC voltages may be converted to a second power by controlling a second DC-DC converter 42, and the second power may be provided to the load 300. The second power is less than the first power. Usually, the first power is high power, and the second power is low power.

In an optional embodiment, the downhole power generation method of the present disclosure may further include the following block B46 after block B43 and before block B44 or block B45.

In block B46, the one or more DC voltages may be increased by one or more boost circuits 50 to obtain one or more increased DC voltages. In this circumstance, in block B44, the first DC-DC converter 41 can convert the one or more increased DC voltages to the first power in the working mode, and in block B45, the second DC-DC converter 42 can convert the one or more increased DC voltages to the second power in the non-working mode.

Therefore, the downhole power generation method of the present disclosure can provide different powers to the load 300 in the working mode and in non-working mode, and power loss can be thus reduced greatly.

Furthermore, the downhole power generation method of the present disclosure can ensure that the flow of the downhole fluid can drive one or more of the plurality of turbines 10 distributed in a multiphase environment, and thus the downhole power generation method of the present disclosure can achieve a reliable and redundant power supply for the load 300.

The downhole power generation method of the present disclosure may further include providing additional power to the load 300 when power generating from the one or more turbines 10 is not enough for the load 300.

The downhole power generation method of the present disclosure may further include providing additional electrical energy to the load 300 when energy generating from the one or more turbines 10 is not enough for the load 300. Furthermore, the downhole power generation method of the present disclosure may further include storing excessive energy generating from the one or more turbines 10 in an energy storage device (for example the energy storage device 70 as shown in FIG. 1, or the centralized energy storage device 90 as shown in FIG. 2) when the energy generating from the one or more turbines 10 is excessive for the load 300.

Therefore, the downhole power generation method of the present disclosure may enable high power density and cost effective design with high reliability and long lifetime operation.

While steps of the downhole power generation method in accordance with embodiments of the present disclosure are illustrated as functional blocks, the order of the blocks and the separation of the steps among the various blocks shown in FIG. 4 are not intended to be limiting. For example, the blocks may be performed in a different order and a step associated with one block may be combined with one or more other blocks or may be sub-divided into a number of blocks.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A downhole power generation system, comprising:
   a power generation module for providing power to a load, comprising:
      a turbine driven by flow of a downhole fluid to rotate,
      a generator coupled with the turbine for converting rotational energy from the turbine to electrical energy, and
      an AC-DC rectifier coupled with the generator for converting an alternating voltage from the generator to a direct voltage; and
   a power conversion circuit coupling the AC-DC rectifier with the load, the power conversion circuit including a first DC-DC converter coupled to the load by a first electrical connection and providing a first power to the load when the load is in a working mode and a second DC-DC converter coupled to the load by a second electrical connection and providing a second power to the load when the load is in a non-working mode, the second power being less than the first power.

2. The downhole power generation system of claim 1, further comprising:
   a power converter controller communicatively coupled with the first DC-DC converter and the second DC-DC converter respectively and configured for respectively controlling the first DC-DC converter and the second DC-DC converter to switch between the working mode and the non-working mode.

3. The downhole power generation system of claim 1, wherein the power generation module comprises:
   a boost circuit coupling the AC-DC rectifier with at least one of the first DC-DC converter and the second DC-DC converter.

4. The downhole power generation system of claim 3, wherein the boost circuit comprises:
   a first step-up converter for increasing the direct voltage from the AC-DC rectifier;
   a second step-up converter for further increasing the increased direct voltage from the first step-up converter; and
   a capacitor coupled between the first step-up converter and the second step-up converter for power buffer.

5. The downhole power generation system of claim 3, further comprising: a power storage device between the boost circuit and at least one of the first DC-DC converter and the second DC-DC converter.

6. The downhole power generation system of claim 5, wherein the power storage device is a capacitor.

7. The downhole power generation system of claim 3, further comprising:
   an energy storage device coupled between the boost circuit and at least one of the first DC-DC converter and the second DC-DC converter via a step-up converter.

8. The downhole power generation system of claim 1, wherein the downhole power generation system comprises a plurality of power generation modules, the power conversion circuit couples the AC-DC rectifier in each power generation module with the load, and the plurality of turbines in the plurality of power generation modules are so positioned physically that one or more of the turbines is exposed to the downhole fluid and the flow of the downhole fluid drives the one or more of the turbines to rotate.

9. The downhole power generation system of claim 8, wherein rotational speeds of the one or more of the turbines and the direct voltages generated from the plurality of power generation modules depend on the e physical positions of respective turbines of the one or more of the turbines.

10. The downhole power generation system of claim 8, wherein the downhole fluid flows within a casing, and the plurality of turbines are spacedly arranged at an inner circumferential wall of the casing or deployed closer to the center of the casing.

11. The downhole power generation system of claim 8, further comprising: a power storage device between each of the power generation modules and at least one of the first DC-DC converter and the second DC-DC converter.

12. The downhole power generation system of claim 8, further comprising: energy storage device coupled between each of the power generation modules and at least one of the first DC-DC converter and the second DC converter via a step-up converter.

13. The downhole power generation system of claim 12, wherein the energy storage device is a battery.

14. The downhole power generation system of claim 1, wherein the load is a sensor.

15. A downhole power generation method, comprising:
   driving one or more turbines, by flow of a downhole fluid, to rotate;
   converting one or more rotational energies from the one or more turbines, by one or more generators, to one or more electrical energies respectively;
   converting one or more alternating voltages from the one or more generators, by one or more AC-DC rectifiers, to one or more direct voltages respectively;
   converting the one or more direct voltages, by controlling a first DC-DC converter connected to a load by at least a first electrical connection, to a first power and providing the first power to the load when the load is in a working mode; and
   converting the one or more direct voltages, by controlling a second DC-DC converter connected to the load by at least a second electrical connection, to a second power and providing the second power to the load when the load is in a non-working mode, wherein the second power is less than the first power.

16. The downhole power generation method of claim 15, further comprising:

increasing the one or more direct voltages, by one or more boost circuits, to obtain one or more increased direct voltages, wherein the first DC-DC converter converts the one or more increased direct voltages to the first power and the second DC-DC converter converts the one or more increased direct voltages to the second power.

17. The downhole power generation method of claim 15, further comprising:

providing additional power to the load when the one or more electrical energies generated from the one or more turbines is not enough for the load.

18. The downhole power generation method of claim 15, further comprising: storing one or more excessive electrical energies generated from the one or more turbines in an energy storage device when the one or more electrical energies generated from the one or more turbines is excessive for the load.

\* \* \* \* \*